(12) United States Patent
Gaiduk et al.

(10) Patent No.: US 11,988,824 B2
(45) Date of Patent: May 21, 2024

(54) MICROSCOPE AND METHOD FOR FORMING A MICROSCOPIC IMAGE WITH AN EXTENDED DEPTH OF FIELD

(71) Applicants: Carl Zeiss Microscopy GmbH, Jena (DE); SD Optics, Inc., Seoul (KR); Stereo Display, Inc., Anaheim, CA (US)

(72) Inventors: Alexander Gaiduk, Jena (DE); Ilja Karanin, Munich (DE); Pavlos Iliopoulos, Weimar (DE); Jin Young Sohn, Fullerton, CA (US); Gyoungil Cho, Fullerton, CA (US); Cheong Soo Seo, Brea, CA (US)

(73) Assignees: Carl Zeiss Microscopy GmbH, Jena (DE); SD Optics, Inc., Seoul (KR); Stereo Display, Inc., Anaheim, CA (US)

( * ) Notice: Subject to any disclaimer, the term of this patent is extended or adjusted under 35 U.S.C. 154(b) by 219 days.

(21) Appl. No.: 17/696,744

(22) Filed: Mar. 16, 2022

(65) Prior Publication Data
US 2022/0299746 A1 Sep. 22, 2022

(30) Foreign Application Priority Data
Mar. 17, 2021 (EP) .................................. 21163120

(51) Int. Cl.
*G02B 21/36* (2006.01)
*H04N 25/531* (2023.01)
*H04N 25/705* (2023.01)

(52) U.S. Cl.
CPC ......... *G02B 21/361* (2013.01); *H04N 25/531* (2023.01); *H04N 25/705* (2023.01)

(58) Field of Classification Search
CPC ... G02B 21/361; H04N 25/531; H04N 25/705
(Continued)

(56) References Cited

U.S. PATENT DOCUMENTS 7,269,344 B2  9/2007  Nishioka
8,581,996 B2  11/2013  Inomata
(Continued)

FOREIGN PATENT DOCUMENTS

DE        19733193 A1    2/1999
DE    102017123511 A1    4/2019
(Continued)

OTHER PUBLICATIONS

S Kuthirummal et al: Flexible Depth of Field Photography, IEEE Transactions on Pattern Analysis and Machine Intelligence, vol. 33, No. 1, Jan. 1, 2011 (Jan. 1, 2011), pp. 58-71.
(Continued)

*Primary Examiner* — Robert J Hance
*Assistant Examiner* — Kristin Dobbs
(74) *Attorney, Agent, or Firm* — Kaplan Breyer Schwarz LLP; Stuart H. Mayer

(57) ABSTRACT

The present invention concerns a method for producing a microscopic image with an extended depth of field by means of a microscope. The microscope comprises an images sensor that comprises pixels that are arranged as a matrix that is formed by lines. In a step of the method, a plurality of microscopic frames of a specimen is acquired while a focus position (z) is changed. The microscopic frames are acquired line by line. The focus position (z) is changed over a course of acquiring individuals of the microscopic frames. In a further step, parts of individuals of the acquired lines are identified. These parts sharply image the specimen. The identified parts of the lines are composed in order to form a microscopic image of the specimen with an extended depth
(Continued)

of field. Furthermore, the present invention concerns a microscope.

15 Claims, 3 Drawing Sheets

(58) Field of Classification Search
USPC .......................................................... 348/79
See application file for complete search history.

(56) References Cited

U.S. PATENT DOCUMENTS

| | | |
|---|---|---|
| 2014/0185462 A1 | 7/2014 | Guo |
| 2015/0185464 A1 | 7/2015 | Karube |
| 2015/0185465 A1 | 7/2015 | Karube |
| 2017/0318216 A1* | 11/2017 | Gladnick .............. G02B 21/361 |
| 2019/0107702 A1* | 4/2019 | Gaiduk ................ G02B 21/241 |
| 2019/0384051 A1* | 12/2019 | Gaiduk .............. G02B 21/0048 |
| 2020/0195836 A1 | 6/2020 | Senekerimyan |

FOREIGN PATENT DOCUMENTS

| | | |
|---|---|---|
| DE | 102019119310 A1 | 1/2021 |
| EP | 2813803 A1 | 12/2014 |
| EP | 3401721 A1 | 11/2018 |
| WO | 2005/119331 A1 | 5/2005 |
| WO | 2007/134264 A3 | 5/2007 |

OTHER PUBLICATIONS

Hajime Nagahara et al: Flexible Depth of Field Photography, Electronic Publishing, Artistic Imaging, and Digital Typography; [Lecture Notes in Computer Science, ISSN 0302-9743], Springer Verlag, DE, vol. 5305, Oct. 11, 2008 (Oct. 11, 2008), pp. 60-73.
Carl Zeiss Microscopy GmbH "Zeiss Axiocam Family—Your Guide to Microscope Camera Technology from Zeiss" Version 1.0, Oct. 2017 Brochure, 37 pages.
Takeo Ogama "What to Consider When Choosing a Microscope Camera" of Scientific Solutions Division of Olympus Corporation of the Americas, Jan. 2019, white paper.
G. Häusler "A method to increase the depth of focus by two step image processing" in Optics Communications, vol. 6, Issue 1, Sep. 1972, pp. 38-42.

* cited by examiner

MICROSCOPE AND METHOD FOR FORMING A MICROSCOPIC IMAGE WITH AN EXTENDED DEPTH OF FIELD

BACKGROUND OF THE INVENTION

The present invention relates firstly to a method for producing a microscopic image with an extended depth of field by means of a microscope. The invention further relates to a microscope with an objective lens for optically imaging a specimen.

In the white paper by Takeo Ogama "What to Consider When Choosing a Microscope Camera" of Scientific Solutions Division of Olympus Corporation of the Americas, January 2019, the factors of a camera, which contribute to the quality of microscopic imaging, are discussed. For instance, the rolling shutter is explained. The image distortion caused by the rolling shutter is a side effect of the fast readout feature of CMOS sensors. For fast moving samples, a global shutter followed by the global reset feature is an ideal solution that can help suppress the distortion.

In the brochure by Carl Zeiss Microscopy GmbH "Zeiss Axiocam Family—Your Guide to Microscope Camera Technology from Zeiss" Version 1.0, October 2017, microscope cameras are presented. Regarding CMOS technology, it is stated that widely used rolling shutter architecture can cause geometrical distortions from moving objects.

In the paper by Sujit Kuthirummal, Hajime Nagahara, Changyin Zhou, and Shree K. Nayar "Flexible Depth of Field Photography" in Proceedings of the 10$^{th}$ European Conference on Computer Vision, Marseille, France, 12-18 Oct. 2008, pages 60 to 73, a prototype camera is described that uses a micro-actuator to translate the detector along the optical axis during image integration. Three applications of flexible DOF are presented. An extended DOF is shown where a large depth range is captured with a very wide aperture but with nearly depth-independent defocus blur. Applying deconvolution to a captured image gives an image with extended DOF and yet high SNR. Further, the capture of images with discontinuous DOFs is shown. For instance, near and far objects can be imaged with sharpness while objects in between are severely blurred. Furthermore, a camera is described that captures images with tilted DOFs without tilting the image detector.

In the paper by G. Häusler "A method to increase the depth of focus by two step image processing" in Optics Communications. Volume 6, Issue 1, September 1972, pages 38-42, a method to obtain an increased depth of field is presented. That method consists of two steps. The first step is to produce a modified incoherent image of the three dimensional object which, though degraded, has the same degradation for all object planes. The second step is to filter this modified image in a coherent image processor to obtain an undegraded image with increased depth of focus.

DE 197 33 193 A1 teaches a microscope with an adaptive optics. A transmitting wave front modulator is located between an objective and a tube lens. The microscope can be used for confocal microscopy, for laser-supported microscopy, for conventional microscopy, or for analytic microscopy.

U.S. Pat. No. 7,269,344 B2 teaches an optical apparatus that has an imaging optical system provided with a deformable mirror and an electronic zoom function. A ray deflecting function of the deformable mirror is changed in accordance with a change of an object area corresponding to an image to be used. This solution aims at a high sharpness of a taken image even when a variable magnification ratio is increased.

WO 2005/119331 A1 teaches a variable focal length lens comprising a plurality of micromirrors with two degrees of freedom rotation and one degree of freedom translation. The two degrees of freedom rotation and one degree of freedom translation of the micromirrors are controlled to change the focal length of the lens and to satisfy the same phase conditions for the lights. The lens is diffractive Fresnel lens.

WO 2007/134264 A2 shows a three-dimensional imaging system with a variable focal length micromirror array lens. The micro mirror array lens comprises a plurality of micromirrors, wherein each of the micromirrors is controlled to change the focal length of the micromirror array lens. The imaging system further comprises an imaging unit and an image processing unit which produces three-dimensional image data using the images captured by the imaging unit and the focal length information of the micromirror array lens.

US 2014/0185462 A1 discloses a microscope with a first motorized drive in the z-direction for positioning a unit comprising an objective lens and a camera and with a second motorized drive in the z-direction for positioning a specimen stage for receiving a specimen. The first motorized drive enables images with an extended depth of field to be acquired.

U.S. Pat. No. 8,581,996 B2 discloses an imaging device with which large areas of a specimen can be acquired and digitized and images with an extended depth of field can be outputted. The imaging device comprises a movable specimen stage for receiving the specimen and a unit for changing the focus position. The imaging device further comprises inter alia a camera and a unit for generating the images with an extended depth of field. The images with extended depth of field are omnifocal images.

US 2015/0185465 A1 teaches a digital microscope for acquiring and generating images with an extended depth of field. The microscope is configured to perform asynchronous and parallel positioning in the z-direction, image acquisition, and image processing in order to enable images with an extended depth of field to be acquired and produced more quickly.

In US 2015/0185464 A1, a solution is described that is aimed at saving time in the investigation of a field of view. To achieve this, the magnification factor of an objective lens and the positioning in the z-direction, among other things, are adjusted.

Digital microscopes of types VHX2000 and VHX5000 from the manufacturer Keyence enable microscopic images with an extended depth of field to be acquired. The VHX5000 digital microscope manufactured by Keyence enables the topology of a specimen measuring approximately 138 μm in height to be acquired by means of a stack of 12 images in a period of about 9 seconds.

The SmartZoom5 microscope from the manufacturer Carl Zeiss Microscopy GmbH enables the microscopic image of a specimen with a height of 10 mm to be acquired by means of an image stack with about 60 images in about 25 seconds, with a subsequent calculation of a microscopic image with an extended depth of field taking about 19 seconds. It thus takes about 44 seconds in total to provide the image with extended depth of field.

DE 10 2017 123 511 A1 relates to a method for producing a microscopic image with an extended depth of field by means of a microscope. In a step of the method, a plurality of microscopic frames of a specimen is acquired from different focus positions. In another step, the plurality of microscopic frames is processed so as to form a microscopic image with an extended depth of field. The focus position is continuously changed during the acquisition of at least some of the microscopic frames at a variable speed or with variable acceleration.

DE 10 2019 119 310 A1 teaches a method for generating a microscopic image with an extended depth of field using a microscope. A focus position of the microscope can be changed manually in that a distance between at least one objective lens of the microscope and a sample to be captured can be changed manually. In one step of the method, it is recognized whether a user of the microscope manually changes the focus position according to a periodic function. Several microscopic individual images of a sample with different focus positions are recorded after it has been recognized that the user is changing the focus position according to the periodic function. The multiple microscopic individual images are processed into a microscopic image with an expanded depth of field.

In taking the prior art as a point of departure, it is an object of the present invention to enable microscopic images having an extended depth of field to be produced more quickly with less effort.

SUMMARY OF THE INVENTION

The aforementioned object is achieved by a method according to the enclosed claim 1 and by a microscope according to the enclosed claim 15.

The method according to the invention is used to generate a microscopic image with an extended depth of field (EDoF), which is also referred to as an EDoF image. For this purpose, a microscope is used which is particularly a digital microscope. The microscope comprises an objective lens and an image sensor for converting an image reflected directly or indirectly from the objective lens onto the image sensor.

In one step of the method according to the invention, a plurality of microscopic frames of a specimen is acquired with the microscope while a focus position of the microscope is changed. The microscopic frames are acquired from different focus positions, so that each of the individual regions of the specimen is sharply imaged in at least one of the microscopic frames. The different focus positions are especially preferably achieved through varying actuation of a microsystem with movable mirrors. As a preferred alternative, the different focus positions are achieved through varying actuation of a deformable optical lens. As a preferred alternative, the different focus positions are formed by varying a distance between the specimen and the objective lens of the microscope. The distance between the specimen and the objective lens of the microscope can also be described as the z-coordinate. Hence, the focus position can be described by a value of the z-coordinate. The z-coordinate is typically in vertical direction which is referred to as z-direction. The microscopic frames form a stack. The frames of the stack differ from one another by the z-coordinate of their acquisition, so that they can also be referred to as a z-stack.

The image sensor comprises pixels that are arranged as a matrix. The matrix is formed by lines, i. e., the matrix includes a plurality of lines. These lines are horizontal lines or vertical lines of the image sensor. The microscopic frames are acquired line by line of this matrix. After one of the horizontal or vertical lines of one of the microscopic frames is acquired a next one of the lines of this microscopic frame is acquired. Hence, the next acquired line represents the specimen at a later point in time than the previously acquired line.

The focus position is changed over a course of acquiring individuals of the microscopic frames. Hence, the next acquired line is acquired at another focus position than the previously acquired line. The lines or parts of the lines of an individual one of the microscopic frames are acquired at different focus positions. The next acquired line can contain partially or completely different z-information compared to previously acquired line or the line acquired after that line.

Preferably, an x-coordinate and a y-coordinate of a position of the sample are not changed while the focus position representing the z-coordinate is changed. The x-coordinate is measured in an x-direction and the y-coordinate is measured in a y-direction. The x-direction and the y-direction are perpendicular to the z-direction. Preferably, the x-coordinate and the y-coordinate of the position of the sample are changed slower than the focus position is changed. Preferably, the x-coordinate and the y-coordinate of the position of the sample are changed slower than the image sensor is read out in the x-direction.

In a next step, parts of the acquired microscopic frames are selected. These parts shall be suitable for forming the aimed image with an extended depth of field. Hence, parts of individuals of the acquired lines are identified, wherein these parts sharply image the specimen. These parts sharply image the specimen at least to a minimum degree. In preferred embodiments, these parts are individual pixels of the microscopic frames. Hence, individual groups of pixels of individuals of the acquired lines are identified, wherein these pixels sharply image the specimen.

In the case that the x-coordinate and the y-coordinate of the position of the sample are not changed while the focus position of the microscope is changed the described step of selecting parts of the acquired microscopic frames allows artefacts-free image processing. Preferably, the plurality of microscopic frames is combined together where for each of the pixels showing the same x-coordinates and the same y-coordinates the date between microscopic frames can be analysed in order to search for a global maximum value and/or local maximum values; or data can be sorted, e. g., from maximum to minimum, in order to identify regions with maximal intensity and lowest intensity or noise level.

In a next step, the identified parts of the lines of the microscopic frames are composed in order to form a microscopic image of the specimen, wherein this microscopic image shows an extended depth of field. This microscopic image only contains sharp parts, insofar as possible. Composing the identified parts of the lines preferably depends on requirements of experiment comprising a speed of composing, a pre-defined noise suppression, a pre-defined degree of an area completeness of the aimed microscopic image with an extended depth of field, and/or on other image related analysis. If the parts of the lines are pixels of the acquired microscopic frames, the identified pixels are composed in order to form a microscopic image of the specimen, wherein this microscopic image shows an extended depth of field.

One particular advantage of the method according to the invention is that the microscopic frames can be acquired very fast with a high sensitivity since they are acquired line by line. That acquisition preferably includes acquisition of further image-sensor-architecture-specific functions for signal processing, such as dynamic range adjustment, offset application and others. In contrast, acquiring a microscopic frame as a whole in one point of time with a global shutter helps to insure information comes from the same focus position in case of a static actuator or the information in z-direction will be blurred to the extend defined by the movement speed in z-direction and the speed of frame acquisition in case of a dynamic z-actuator. Also, global shutter image sensors tend to be slower, more expensive and more need more attention for handling in system integration.

In preferred embodiments, the plurality of microscopic frames is acquired by using a rolling shutter. Rolling shutter is a method of image capture in which a frame is captured by scanning across the field of view, either vertically or horizontally. The rolling shutter can be either mechanical or electronic. Preferably, the rolling shutter is electronic. Especially, the rolling shutter is implemented as a routine for reading out the image sensor. The image sensor is preferably a CMOS image sensor. CMOS image sensors can be read out faster compared to global shutter. The plurality of microscopic frames is acquired by using the image sensor with a rolling shutter.

In preferred embodiments, the focus position is changed by changing a distance between the specimen and the objective lens of the microscope or by changing the focus position along a spatial extension of the specimen. The focus position is preferably changed, for example, by controlling a microsystem with movable mirrors or by deforming a deformable optical lens of the objective.

Preferably, the focus position is changed continuously over the course of acquiring individuals of the microscopic frames.

In further preferred embodiments, the focus position is changed stepwise or according to a pre-defined function. The pre-defined function can be a random function. If the focus position is changed stepwise, a step duration is preferably 10 ms or less. In further preferred embodiments, the focus position is changed periodically. Preferably, the focus position is changed periodically between a minimum of the focus position and a maximum of the focus position. Preferably, the focus position is changed according to a sine wave. Preferably, a frequency of the periodical change is at least 100 Hz. More preferably, the frequency of the periodical change is at least 1 kHz. That frequency can also be more than 10 kHz.

In preferred embodiments, the plurality of microscopic frames is acquired during at least ten periods of the periodical change of the focus position. Preferably, the focus position is changed at a high frequency as described above. Because of that fast change, many periods of the change are run through until the plurality of microscopic frames is acquired. More preferably, the plurality of microscopic frames is acquired during at least 100 periods of the periodical change of the focus position. Preferably, each of the microscopic frames is acquired during the time of at least 10 periods of the periodical change of the focus position.

In preferred embodiments, the plurality of microscopic frames comprises at least 20 of the microscopic frames. More preferably, the plurality of microscopic frames comprises at least 100 of the microscopic frames. This quantity defines the z-stack.

In preferred embodiments of the method, the acquisition of the plurality of microscopic frames images is continued until a fulfilment of conditions to stop, especially, until a pre-defined quality factor is achieved. These conditions preferably comprise a degree of image area completeness of the microscopic image with an extended depth of field, an absence of pre-defined artefacts, and/or a presence of pre-defined features. The pre-defined artefacts preferably comprise noise, missing data, and/or dark images. The pre-defined features preferably comprise sharp edges and/or flat surfaces. The quality factor is preferably related to image acquisition conditions that preferably comprise exposure time, noise level, data transfer rate, and/or illumination intensity. The quality factor is preferably related to sample-specific parameters that preferably comprise colour, monochrome, a priori information, and/or sample classification data. The quality factor is preferably related to image information content that preferably comprises a degree of z-information estimation over an area, a degree of artefacts, a degree of missing data, and/or a degree of underexposed or overexposed areas.

Preferred embodiments of the method comprise a further step in which a value of the focus position is recorded for each part of the lines of each of the microscopic frames. The composition of the identified parts of the lines in order to form a microscopic image of the specimen with an extended depth of field is based on the recorded values of the focus position assigned to the identified parts of the lines. The values of the focus position are preferably formed by z positions. The values of the focus position are used for processing the identified parts of the lines of the microscopic frames in order to form the microscopic image with an extended depth of field, especially, for a correction of the magnification of each of the parts resulting in a microscopic image with an extended depth of field that is based on a uniform magnification. If the identified parts of the lines are pixels, a value of the focus position is preferably recorded for each pixel of the lines of each of the microscopic frames.

Preferred embodiments of the method comprise a further step in which values of height for the microscopic image with an extended depth of field are ascertained based on the recorded values of the focus position assigned to the identified parts of the lines. The values of height are assigned to individual pixels or to individual groups of pixels of the microscopic image with an extended depth of field. The values of height are related to the specimen. These values describe the height of the specimen at a certain point of the specimen that is captured at the assigned pixel or at the assigned group of pixels. The values of height describe the dimension of the specimen in z-direction. The values of height define a height map of the specimen. The height map matches the microscopic image with an extended depth of field.

In preferred embodiments of the method, the values of height in the z-direction correspond to a pixel with the value of height in the z-direction as defined by a corresponding position of an actuator for changing the focus position. This relation is preferably based on the time. For this purpose, a timing signal from the actuator in a form of time-stamps or trigger signals is preferably related to the timing of reading-out the image sensor in a form of time-stamps and/or in a form of trigger signals related to pixel readouts or line of pixels read out or frame readout defined for complete frames or for pre-defined regions of interest.

Preferred embodiments of the method comprise a further step in which a microscopic three-dimensional image of the specimen is ascertained based on the microscopic image with an extended depth of field and based on the values of height. Since the values of height describe the dimension of the specimen in z-direction, these values can be used for generating a three-dimensional image.

In preferred embodiments, the focus position is controlled in order to change the focus position. This is typically done by an electronic controller that controls an actuator for changing the focus position. That actuator preferably comprises a microsystem for mechanically moving micromirrors. Hence, the focus position is controlled by controlling the microsystem for mechanically moving micromirrors. The focus position is controlled based on a command value of the focus position. The command value results from the desired temporal course of changing the focus position. The command value depends on time. The command value is typically calculated by the controller. The command value is preferably used for recording a value of the focus position for each part of the lines of each of the microscopic frames. This can be done in this way since the actual temporal course of changing the focus position is close to the desired temporal course of changing the focus position if no malfunction occurs. Since each pixel of each of the microscopic frames is assigned to a point in time that pixel is also assigned to a command value of the focus position. Accordingly, each part of each of the microscopic frames is assigned to a point in time and, hence, that part is also assigned to a command value of the focus position. Each microscopic frame contains parts of the lines that originate from a position with a defined x-coordinate a defined y-coordinate but from different z-coordinates.

In order to identify parts of individuals of the acquired lines that sharply image the specimen, the acquired microscopic frames have to be analysed regarding their sharpness. Preferably, the parts of the acquired lines are identified by applying a sharpness function onto a signal of the image sensor over time. For instance, the parts of the acquired lines are identified by searching maxima of the signal of the image sensor over time. That signal represents the parts of individuals of the lines that shows the same x-coordinates and the same y-coordinates but different z-coordinates. The maxima are searched within sections of this signal that individually are related to a local position of the respective part of the lines, especially, to an x-y-position within the frame that is the position of the pixel to be identified. These maxima are preferably global maxima in the respective section of the temporal signal. The temporal signal results from acquiring the frames line by line, especially, by using the rolling shutter. The temporal signal of the image sensor represents the content of the microscopic frames. The maxima represent those parts of the lines of the microscopic frames at the respective local position that are most sharp. The part of the lines are identified, i. e., are selected in order to be composed to form the microscopic image with an extended depth of field.

In further preferred embodiments, more than one part of the acquired lines is identified regarding each local position of the respective part of the lines, especially, regarding an x-y-position within the frame that is the position of the pixel to be identified. Hence, more than one maximum is searched within each section of the signal that is related to the local position of the respective part of the lines, especially, to an x-y position within the frame that is the position of the pixel to be identified. These maxima preferably comprise a global maximum and local maxima in the respective section of the temporal signal. The more than one identified part of the acquired lines regarding each local position are preferably composed to more than one microscopic image of the specimen with an extended depth of field. This results in a multiple microscopic image with an extended depth of field.

In preferred embodiments, the plurality of the microscopic frames is acquired at a frame rate of at least 10 frames per second. More preferably, the plurality of the microscopic frames is acquired at a frame rate of at least 50 frames per second. More preferably, the plurality of the microscopic frames is acquired at a frame rate of at least 100 frames per second.

The above-mentioned steps for forming a microscopic image with an extended depth of field are preferably repeated periodically in order to form a sequence of the images with an extended depth of field. Preferably, the images with an extended depth of field are formed at a rate of at least ten images per second. Preferably, the images with an extended depth of field are formed at a rate of at least 50 images per second. In the above-mentioned embodiments, in which a microscopic three-dimensional image of the specimen is ascertained, the steps for ascertaining a microscopic three-dimensional image are preferably repeated periodically in order to form a sequence of the microscopic three-dimensional images. Preferably, the microscopic three-dimensional images are formed at a rate of at least 10 images per second.

The microscope according to the invention is digital and comprises an objective lens for the enlarged optical imaging of a specimen on an image plane. The objective lens comprises optical components for enlarged optical imaging of the specimen on the image plane. The optical components are particularly instantiated by optical lenses and optionally also by one or more mirrors, shutters, and filters.

The microscope preferably comprises an image sensor for converting the image reflected directly or indirectly on the image sensor by the objective lens into an electrical signal.

The microscope comprises at least one actuator for changing a focus position of the microscope. In simple embodiments, the actuator is preferably designed to change a distance between a specimen and the objective lens. For this purpose, the actuator preferably comprises an electric motor for moving a specimen stage carrying the specimen or for moving the objective lens. The actuator is preferably designed to change a focal length of the objective lens. The actuator is preferably used to actuate an active optical element with which the focus can be adjusted. Especially preferably, the actuator of the active optical element is a microsystem for mechanically moving micromirrors and/or microlenses. The micromirrors preferably form a lens. By changing the position of the micromirrors, the focal length of the lens can be changed very quickly. This quick changing of the focal length enables the focus position to be adjusted very quickly. As a preferred alternative, the actuator is designed to deform a deformable optical lens.

The microscope further comprises a control and image processing unit, which serves the purpose of controlling the actuator and processing microscopic frames. The control and image processing unit is configured to carry out the method according to the invention. The control and image processing unit is preferably configured to carry out one of the described preferred embodiments of the method according to the invention. Moreover, the microscope preferably also has features that are specified in connection with the method according to the invention and its preferred embodiments.

The microsystem for mechanically moving micromirrors is preferably a mirror array lens system. Such mirror array lens systems are offered under the trademark MALS.

BRIEF DESCRIPTION OF THE DRAWINGS

Additional advantages, details and refinements of the invention will become apparent from the following description of preferred embodiments of the invention, making reference to the drawing. There are shown.

DETAILED DESCRIPTION OF THE INVENTION

Figure 1:
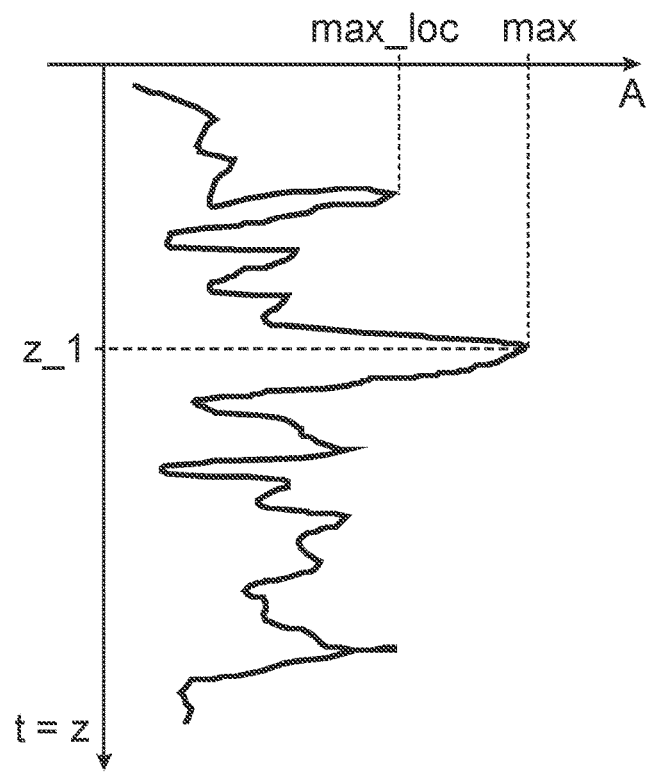
FIG. 1 is a diagram of signal intensity over time representing a preferred embodiment of a method according to the invention.

FIG. 1 shows a diagram of signal intensity A over time t representing a preferred embodiment of a method according to the invention. The signal intensity A is measured at an output of an image sensor (not shown) of a microscope (not shown). The signal intensity A is related to a local position of a pixel of the image sensor. The signal intensity A depends on time t since a plurality of microscopic frames is acquired over time t. A focus position at a coordinate z of the microscope (not shown) is changed, e. g., periodically or randomly. Hence, time t and coordinate z are linked. The image sensor (not shown) operates according to a method of a rolling shutter. The image sensor (not shown) is preferably a CMOS sensor.

The signal intensity A shows a global maximum max at $z=z_1$. At $z_1$, the pixel of the corresponding frame acquired by the image sensor (not shown) is sharp. Due to the rolling shutter, there are also local maxima as, e. g., $max_{loc}$. At these local maxima $max_{loc}$, the pixel of corresponding frame acquired by the image sensor (not shown) is also sharp. The sharp pixels at the global maximum are composed to a microscopic image with an extended depth of field. Optionally, the sharp pixels at the local maxima $max_{loc}$ are composed to further microscopic images with an extended depth of field.

Figure 2:
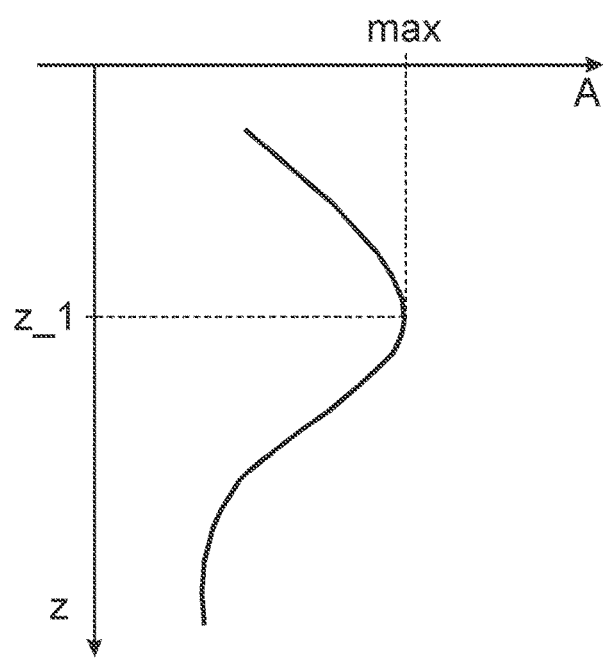
FIG. 2 is a diagram of signal intensity over coordinate z representing a method according to prior art.

FIG. 2 shows a diagram of signal intensity A over coordinate z representing a method according to prior art. The signal intensity A is measured at an output of an image sensor (not shown) of a microscope (not shown). The signal intensity A is related to the local position of a pixel of the image sensor. The signal intensity A depends on time t since a plurality of microscopic frames is acquired over time t. A focus position at a coordinate z of the microscope (not shown) is changed periodically. The image sensor (not shown) operates according to a method of a global shutter. The image sensor (not shown) is, e. g., a CCD sensor. Due to the global shutter, the signal intensity A shows only one maximum max at $z=z_1$. At $z_1$, the pixel of corresponding frame acquired by the image sensor (not shown) is sharp.

Figure 3:
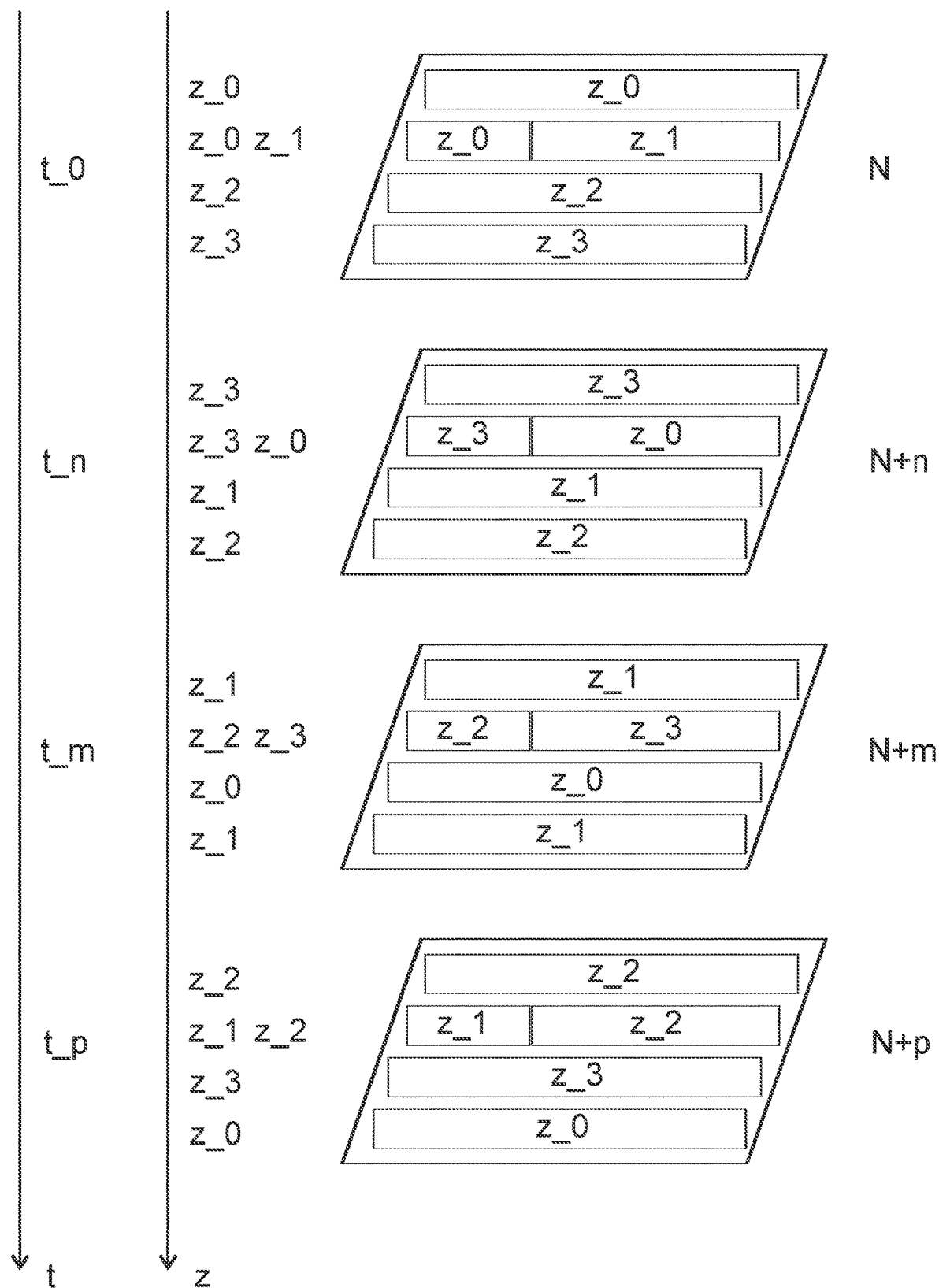
FIG. 3 is a diagram of acquiring microscopic frames according to a preferred embodiment of the method according to the invention.

FIG. 3 shows a diagram of acquiring microscopic frames according to a preferred embodiment of the method according to the invention. The four microscopic frames are numbered as N, N+n, N+m, and N+p. The four microscopic frames N. N+n, N+m, N+p are acquired over time t at $t_0$, $t_n$, $t_m$, and $t_p$. As explained above referring to FIG. 1, the focus position at the coordinate z is changed, e. g., randomly. Since the image sensor (not shown) operates according to a method of a rolling shutter, the lines and parts of the lines, respectively, of each individual microscopic frame N, N+n, N+m, N+p are acquired at different values $z_0$, $z_1$, $z_2$, and $z_3$ of the focus position at the coordinate z.

Figure 4:
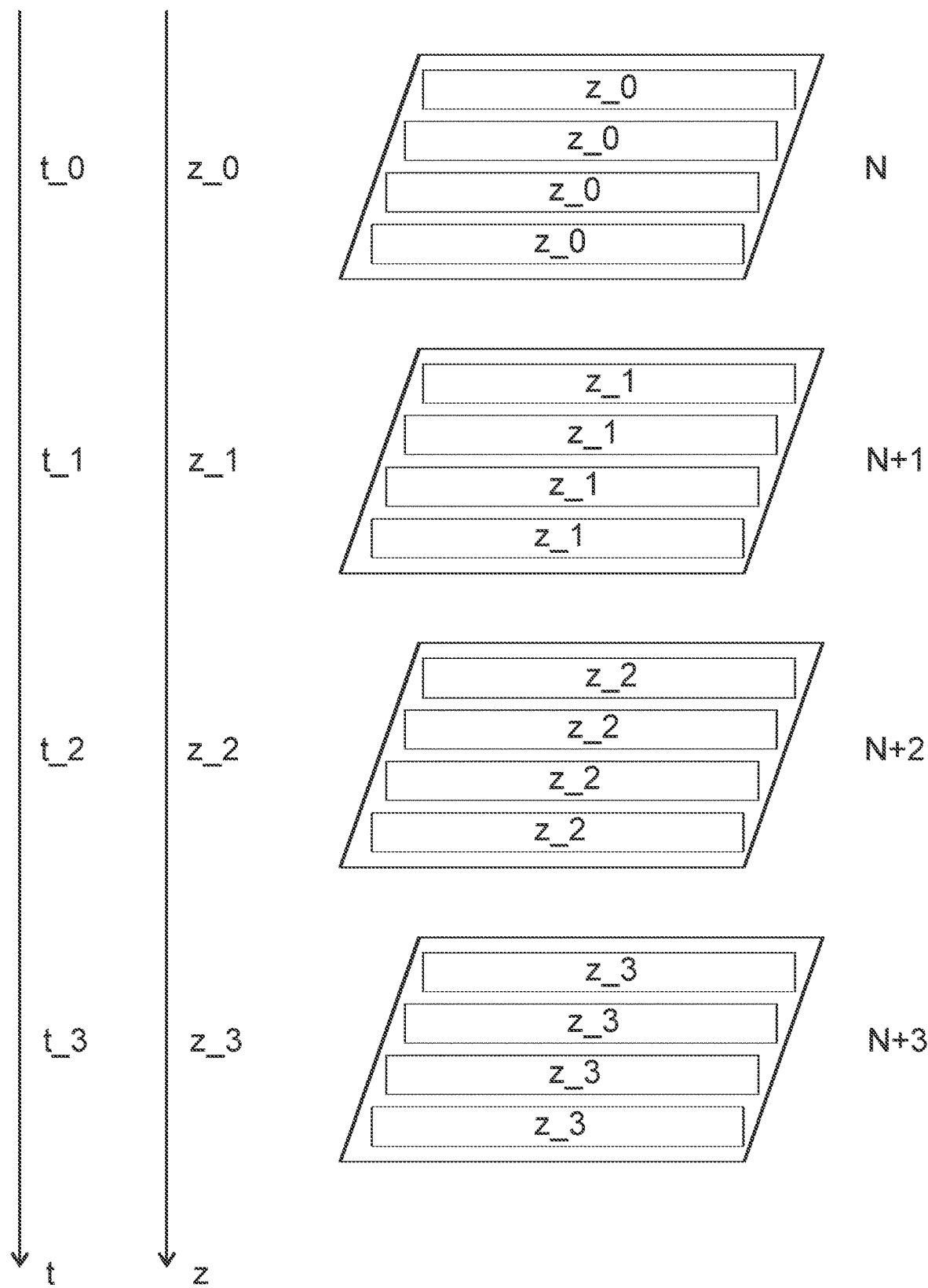
FIG. 4 is a diagram of acquiring microscopic according to prior art.

FIG. 4 shows a diagram of acquiring microscopic according to prior art. The four microscopic frames are numbered as N, N+1, N+2, and N+3. The four microscopic frames N, N+1, N+2, N+3 are acquired over time t at $t_0$, $t_1$, $t_2$, and $t_3$. As explained above referring to FIG. 2, the image sensor (not shown) operates according to a method of a global shutter. Due to the global shutter, every individual microscopic frame N, N+1, N+2, N+3 was acquired at a single value of the focus position at the coordinate z, namely, at $z_0$, $z_1$, $z_2$, and $z_3$, respectively.

In an exemplary embodiment of the method according to the invention, a stack of 20 to 60 microscopic frames of a specimen is acquired while the focus position is changed periodically at a frequency of approximately 100 Hz. The microscopic frames are acquired at a rate of 60 frames per second. Pixels of the acquired lines of the frames that sharply image the specimen are composed to a microscopic image with an extended depth of field.

The invention claimed is:

1. A method for forming a microscopic image with an extended depth of field by means of a microscope that comprises an images sensor, wherein the image sensor comprises pixels that are arranged as a matrix that is formed by lines, wherein the method comprises the following steps:
   acquiring a plurality of microscopic frames of a specimen while a focus position (z) is changed, wherein the microscopic frames are acquired line by line, and wherein the focus position (z) is changed over a course of acquiring individuals of the microscopic frames;
   identifying parts of individuals of the acquired lines that sharply image the specimen;
   composing the identified parts of the lines in order to form a microscopic image of the specimen with an extended depth of field;
   recording a value of the focus position for each of the parts of the lines of each of the microscopic frames; and
   wherein the composition of the identified parts of the lines in order to form a microscopic image of the specimen with an extended depth of field is based on the recorded values of the focus position (z) assigned to the identified parts of the lines.

2. The method according to claim 1, wherein the plurality of microscopic frames is acquired by using a rolling shutter.

3. The method according to claim 1, wherein the focus position (z) is changed by changing a distance between the specimen and an objective of the microscope.

4. The method according to claim 1, wherein the focus position (z) is changed periodically, wherein a frequency of the periodical change is at least 100 Hz.

5. The method according to claim 4, wherein the plurality of microscopic frames is acquired during at least ten periods of the periodical change of the focus position.

6. The method according to claim 1, wherein the focus position (z) is changed stepwise.

7. The method according to claim 1, wherein the plurality of microscopic frames comprises at least 20 of the microscopic frames.

8. The method according to claim 1, further comprising the following step:
   ascertaining values of height for the microscopic image with an extended depth of field based on the recorded values of the focus position (z) assigned to the identified parts of the lines.

9. The method according to claim 8, further comprising the following step:
   ascertaining a microscopic three-dimensional image of the specimen based on the microscopic image with an extended depth of field and based on the values of height.

10. The method according to claim 1, wherein the focus position (z) is controlled in order to change the focus position (z) based on a command value of the focus position, wherein the command value is used for recording a value of the focus position (z) for each part of the lines of each of the microscopic frames.

11. The method according claim 1, wherein the parts of the acquired lines of the microscopic frames are identified by searching maxima (max) of a signal of an image sensor over time.

12. The method according to claim 1, wherein the plurality of the microscopic frames is acquired at a frame rate of at least 10 frames per second.

13. The method according to claim 1, wherein it is repeated periodically in order to form a sequence of the images with an extended depth of field, wherein the images with an extended depth of field are formed at a rate of at least ten images per second.

14. A microscope, comprising:
an objective lens for optically imaging a specimen;
at least one actuator for changing a focus position (z) of the microscope; and
a control and image processing unit being configured to carry out a method according to claim 1.

15. The microscope according to claim 14, wherein at least one actuator further comprises a microsystem for mechanically moving micromirrors and/or microlenses.

* * * * *